(12) United States Patent
Tanaka et al.

(10) Patent No.: US 11,706,378 B2
(45) Date of Patent: Jul. 18, 2023

(54) ELECTRONIC DEVICE AND METHOD OF CONTROLLING ELECTRONIC DEVICE

(71) Applicant: CANON KABUSHIKI KAISHA, Tokyo (JP)

(72) Inventors: Ryosuke Tanaka, Kanagawa (JP); Shin Murakami, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 17/110,615

(22) Filed: Dec. 3, 2020

(65) Prior Publication Data

US 2021/0176409 A1    Jun. 10, 2021

(30) Foreign Application Priority Data

Dec. 5, 2019 (JP) ................... 2019-220357

(51) Int. Cl.
*H04N 5/262* (2006.01)
*H04N 13/239* (2018.01)
(Continued)

(52) U.S. Cl.
CPC ....... *H04N 5/2628* (2013.01); *G02B 27/0101* (2013.01); *G03B 37/04* (2013.01);
(Continued)

(58) Field of Classification Search
CPC ............. H04N 5/2628; H04N 5/23238; H04N 13/239; H04N 13/344; H04N 13/378; H04N 13/356; G02B 27/0101; G02B 2027/0123; G03B 37/04; G06T 19/00; G06T 5/006; G06T 2207/10012; G06F 3/1407

See application file for complete search history.

(56) References Cited

U.S. PATENT DOCUMENTS

2019/0208141 A1   7/2019   Oyama et al.
2019/0215505 A1   7/2019   Ishii et al.
(Continued)

FOREIGN PATENT DOCUMENTS

JP   2019-121858 A   7/2019

OTHER PUBLICATIONS

The above documents were cited in a European Search Report dated May 28, 2021, which is enclosed, that issued in the corresponding European Patent Application No. 2018951.0.

*Primary Examiner* — Joseph W Becker
(74) *Attorney, Agent, or Firm* — Cowan, Liebowitz & Latman, P.C.

(57) ABSTRACT

An electronic device comprising: an acquisition unit configured to acquire an image set including a first image and a second image which have parallax from each other; and a control unit configured to perform control such that 1) in a case of a first display mode where the first image is to be displayed without displaying the second image, the first image is displayed on a display with an orientation of the first image being corrected to be directed to be in a predetermined orientation, and 2) in a case of a second display mode where both the first image and the second image are to be displayed, the first image and the second image are displayed on the display without an orientation of the first image and the second image being corrected to be directed to be in the predetermined orientation.

9 Claims, 9 Drawing Sheets

(51) Int. Cl.
  *G03B 37/04* (2021.01)
  *G02B 27/01* (2006.01)
  *H04N 23/698* (2023.01)

(52) U.S. Cl.
  CPC ......... *H04N 13/239* (2018.05); *H04N 23/698* (2023.01); *G02B 2027/0123* (2013.01)

(56) References Cited

U.S. PATENT DOCUMENTS

| | | | |
|---|---|---|---|
| 2020/0279438 A1* | 9/2020 | Ohashi | H04N 13/111 |
| 2021/0329171 A1* | 10/2021 | Himukashi | H04N 13/106 |
| 2022/0053179 A1* | 2/2022 | Gohara | H04N 13/398 |

* cited by examiner

ELECTRONIC DEVICE AND METHOD OF CONTROLLING ELECTRONIC DEVICE

BACKGROUND OF THE INVENTION

Field of the Invention

The present invention relates to an electronic device that controls display of a VR image, a method of controlling the electronic device, and a non-transitory storage medium.

Description of the Related Art

A technique to display a stereoscopic virtual reality (VR) image by acquiring, with two optical systems, wide angle images having parallax and mapping and displaying the images on a virtual sphere, is known. A twin-lens VR camera for capturing images having parallax includes two optical systems facing in a same direction. Therefore, the twin-lens VR camera captures two images having parallax by one image capturing operation. As the twin-lens VR camera, in particular, a camera that image-captures a wide range of at least 180° vertically and horizontally (hemisphere, 90° in all direction from center of an image) in each optical system, is known.

Further, as a VR display method, a "single-lens VR display" is known, which transforms a VR image to be mapped on a virtual sphere and displays this one image. Another VR display method that is known is a "twin-lens VR display" which displays a VR image for the left eye and a VR image for the right eye side by side in left and right regions respectively.

Japanese Patent Application Publication No. 2019-121858 proposes an electronic device that controls a zenith correction (correction of a pitch angle and roll angle of a VR camera) and a correction of a yaw angle of the VR camera when a VR image captured by the VR camera is displayed, so that a user can easily view the VR image. Here, the electronic device controls the zenith correction and the like in accordance with conditions such as installation location, moving speed and shaking of the VR camera.

If the zenith correction is not performed, the zenith in a VR image and recognition thereof by a user deviate, which makes it difficult to identify and view the VR image. In some cases, unless the zenith correction is performed, performing an operation using the VR image becomes difficult.

When VR images are captured in a state where the twin-lens VR camera is inclined, the VR images are captured in a state where the height of the left optical system and the height of the right optical system are different. Hence, parallax is generated, in the gravity direction (vertical direction), between left and right object images formed on a sensor. Performing zenith correction on VR images (twin-lens VR images) captured in this way corrects the inclination of the VR images, but cannot cancel the parallax in the gravity direction, which causes interruption of recognizing a stereoscopic object. As a result, a user perceives these VR images as double images. Such VR images with which the user perceives double images may cause the user to experience symptoms such as headache, dizziness and nausea, i.e., symptoms of so-called VR sickness. In this way, if the zenith correction is performed in a case where the twin-lens VR display is performed for the twin-lens VR images captured in an inclined state, double images which cause discomfort may be generated. This problem is not considered in Japanese Patent Application Publication No. 2019-121858.

SUMMARY OF THE INVENTION

The present invention is to provide an electronic device that is capable of suitably displaying VR images captured by a plurality of optical systems.

An aspect of the present invention is:

an electronic device comprising at least one memory and at least one processor which function as:

an acquisition unit configured to acquire an image set including a first image and a second image which have parallax from each other; and a control unit configured to perform control such that 1) in a case of a first display mode where the first image is to be displayed without displaying the second image, the first image is displayed on a display with an orientation of the first image being corrected to be directed to be in a predetermined orientation, and 2) in a case of a second display mode where both the first image and the second image are to be displayed, the first image and the second image are displayed on the display without an orientation of the first image and the second image being corrected to be directed to be in the predetermined orientation.

Further features of the present invention will become apparent from the following description of exemplary embodiments with reference to the attached drawings.

DESCRIPTION OF THE EMBODIMENTS

Figure 1A:
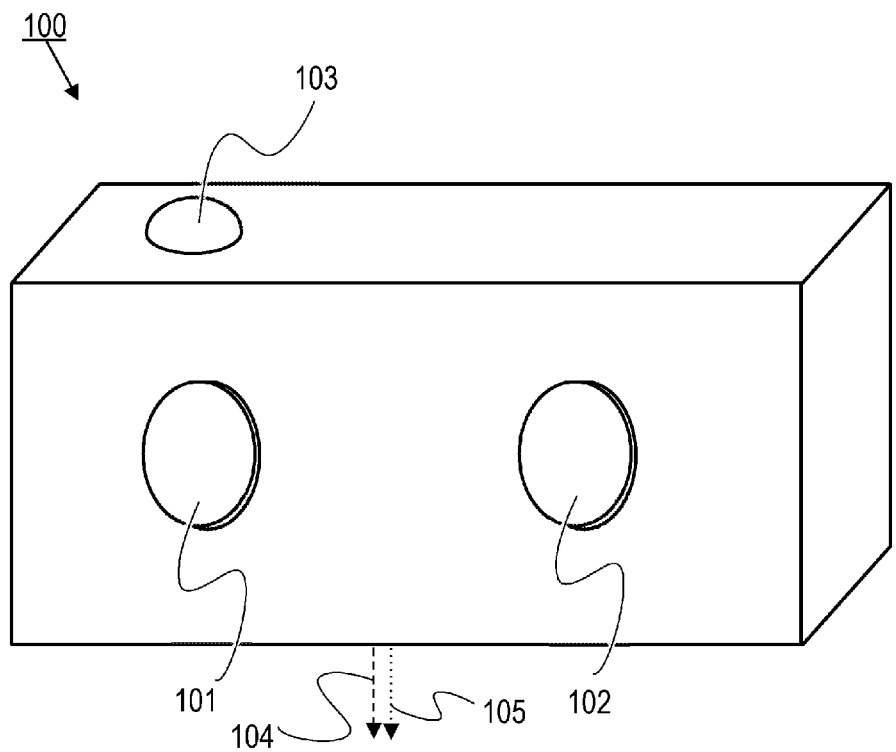
FIG. 1A and FIG. 1B are diagrams for describing a VR camera according to an embodiment.

Embodiments of the present invention will be described with reference to the drawings. First a VR image will be described, then a display control device according to an embodiment will be described.

VR Image

A VR image is an image that can be VR-displayed (displayed in a "VR view" display mode). The VR image includes an omnidirectional image (entire-sphere image) captured by an omnidirectional camera (entire-sphere camera), and a panoramic image of which an image range (effective image range) is wider than a display range of an image that can be displayed on a display unit all at once. The VR image is not only a still image, but includes a moving image and a live view image (image acquired from a camera virtually in real-time). The VR image has an image range (effective image range) of which field of view is at maximum 360° in the vertical direction (vertical angle, angle from the zenith, elevation angle, depression angle, attitude angle, pitch angle), and 360° in the horizontal direction (horizontal angle, azimuth angle, yaw angle).

The VR image also includes an image that has an angle of view (field of view) that is wider than an angle of view that can be imaged (captured) by a standard camera, or that has an image range (effective image range) that is wider than a display range which can be displayed on the display unit all at once, even if the field of view is less than 360° vertically and less than 360° horizontally. For example, an image captured by an omnidirectional camera which can captured an image of an object, in a field of view (angle of view) that is 360° in the horizontal direction (horizontal angle, azimuth angle) and 210° vertical angle with the zenith at the center, is a kind of VR image. Further, for example, an image captured by a camera which can capture an image of a subject in a field of view (angle of view) that is 180° in the horizontal direction (horizontal angle, azimuth angle) and 180° vertical angle with the horizontal direction at the center, is a kind of VR image. In other words, an image which has an image range in a field of view that is at least 160° (±80°) in the vertical direction and the horizontal direction respectively, and which has an image range that is wider than a range that a human can visually recognize all at once is a kind of VR image.

When this VR image is VR-displayed (displayed in a "VR view" display mode), an omnidirectional image that is seamless in the horizontal direction (horizontally rotating direction) can be viewed (watched) by changing the attitude of the display device (display device on which the VR image is displayed) in the horizontally rotating direction. In the vertical direction (vertically rotating direction), an omnidirectional image can be viewed in the +105° range from directly above (zenith), but the range exceeding 105° from directly above is a blank region where no image exists. The VR image can be regarded as "an image of which image range is at least a part of a virtual space (VR space)".

The VR display (VR view) is a display method to display an image in a field of view in accordance with the attitude of the display device, out of a VR image, and is a display method (display mode) in which the display range can be changed. In the case where a head mounted display (HMD), which is a display device, is mounted on the head to view an image, an image in the field of view in accordance with the facial direction of the user is displayed. For example, it is assumed that at a certain timing, out of the VR image an image at a viewing angle (angle of view), of which center is 0° in the horizontal direction (a specific azimuth, such as north) and is 90° in the vertical direction (90° from the zenith, that is horizontal), is displayed. If the attitude of the display device is front-back inverted in this state (e.g. changing the display surface from facing South to facing North), the display range is changed to an image of which visual angle is 180° (opposite azimuth, such as South) at the center in the horizontal direction and 90° at the center in the vertical direction (horizontal) within the same VR image. In the case where the user is viewing an HMD, if the user turns their face from North to South (that is, if the user looks back), the image displayed on the HMD also changes from the image to the North to the image to the South. By this VR display, a visual sensation (sense of immersion) as if the user were in the VR image (VR space) can be provided to the user. A smartphone installed in VR goggles (head mount adaptor) can be regarded as a kind of HMD.

The display method of the VR image is not limited to the above mentioned methods. The display range may be moved (scrolled) not in accordance with a change in attitude, but in accordance with a user operation performed on a touch panel, direction button, and the like. In the VR display (in the display mode "VR view"), the display range may be changeable not only by a change in the attitude but also by touch-move on a touch panel, a drag operation with a mouse, pressing direction buttons, and the like.

Figure 1B:
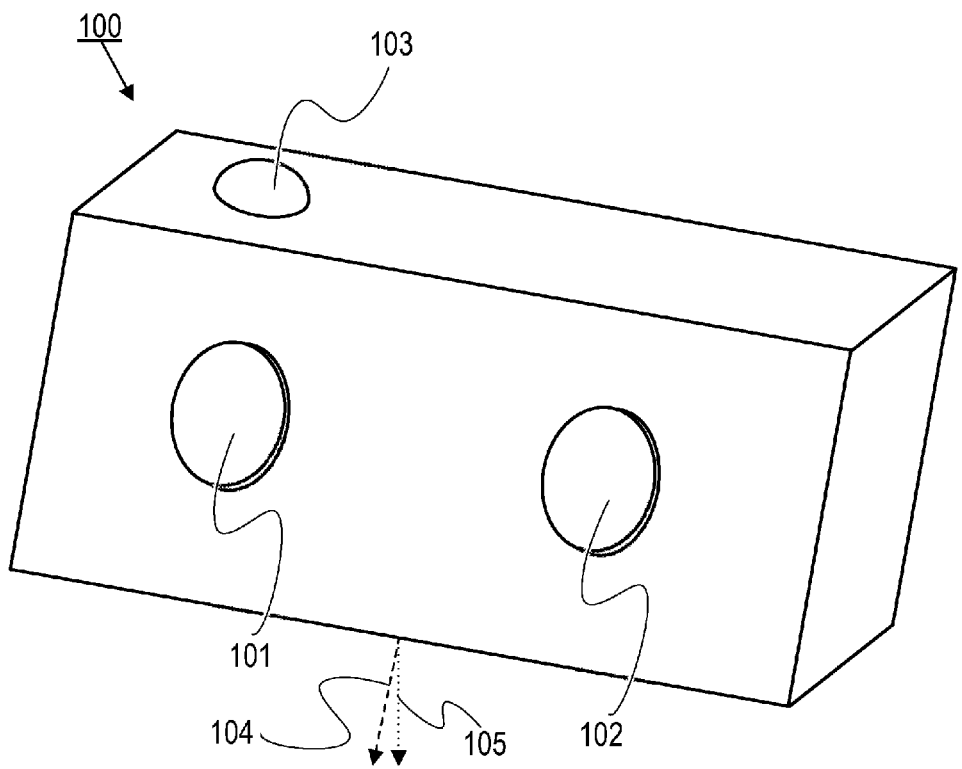

An example of the camera (imaging device) which can capture an image of a subject in a field of view (angle of view) that is 180° in the horizontal direction (horizontal angle, azimuth angle) and a vertical angle that is 180° with the horizontal direction at the center, is a VR camera 100 illustrated in FIG. 1A. The VR camera 100 can capture a 1800 image in front of the camera via the lenses 101 and 102 when the user presses a shutter button 103. If the VR camera 100 is used, the image of the subject can be captured from two locations (two optical systems) of the lens 101 and lens 102, hence two VR images having parallax can be acquired simultaneously (as a set). Here in the state of the VR camera 100 where the lens 101 and the lens 102 are positioned horizontally, as illustrated in FIG. 1A, the vertical direction 104 of the VR camera 100 matches with the gravity direction 105. However, in the state of the VR camera 100 where the lens 101 and the lens 102 are not positioned horizontally, as illustrated in FIG. 1B, the vertical direction 104 of the VR camera 100 does not match with the gravity direction 105. Therefore if the zenith correction is performed on the two VR images captured in the state illustrated in FIG. 1B and the twin-lens VR display is performed, double images may be generated due the influence of the parallax in the gravity direction 105 during the image capturing.

Figure 2A:
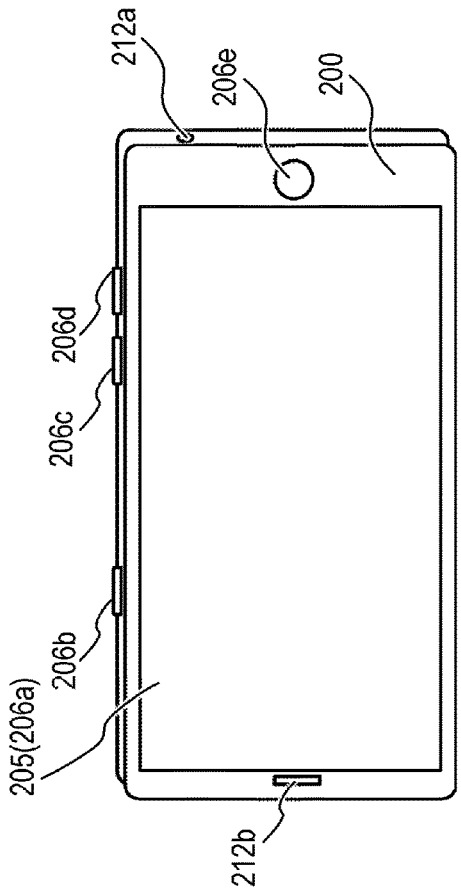
FIG. 2A to FIG. 2C are diagrams for describing a display control device according to an embodiment.

Display Control Device FIG. 2A is an external view illustrating an example of a display control device 200, which is a kind of electronic device. The display control device 200 can acquire a VR image from a VR camera 100, and display the VR image. A display 205 is a display unit that displays images and various information. The display 205 is integrated with a touch panel 206a, as described later. The display control device 200 can detect a touch operation on the display surface of the display 205. The display control device 200 can perform VR display of a VR image (VR content) on the display 205.

An operation unit 206 includes the touch panel 206a and operation units 206b, 206c, 206d and 206e. The operation unit 206b is a power supply button that receives an operation to switch the power supply ON/OFF of the display control device 200. The operation unit 206c and the operation unit 206d are volume buttons to raise/lower the volume of sound outputted from a sound output unit 212. The operation unit 206e is a home button to display a home screen on the display 205.

A sound output terminal 212a is an earphone jack (component) that outputs sound to an earphone, an external speaker, or the like. A speaker 212b is an internal speaker of the electronic device to output sound.

Figure 2B:
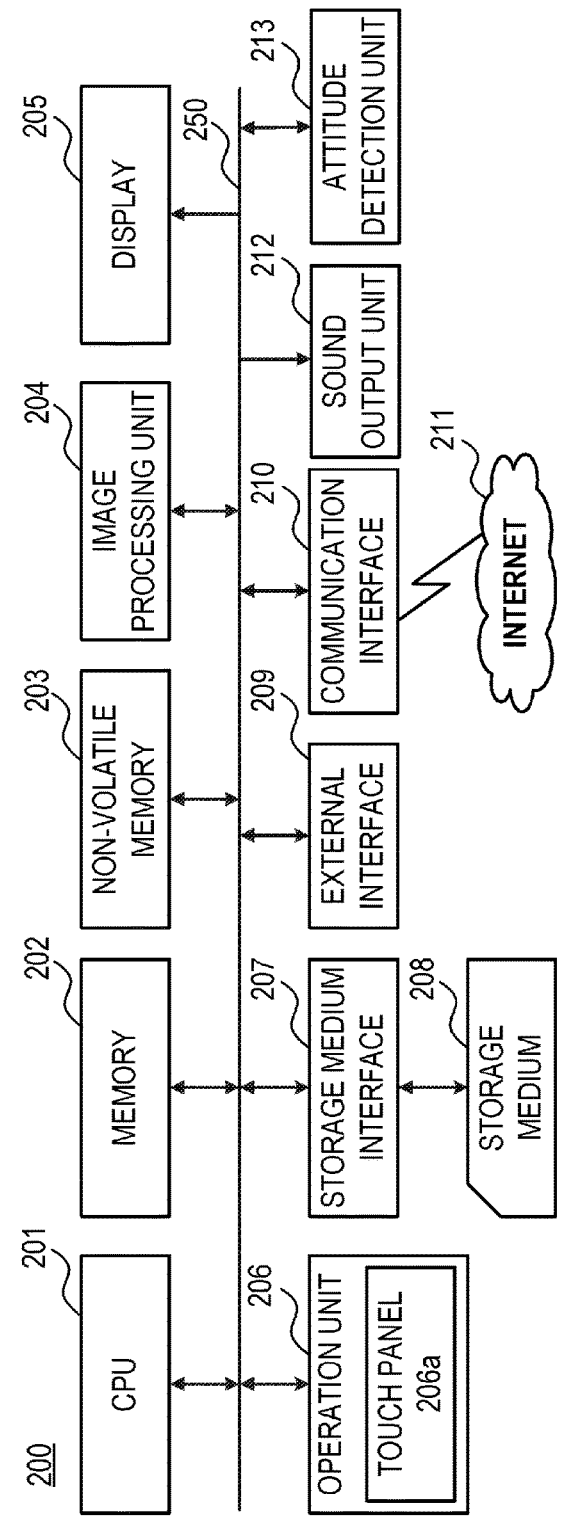

FIG. 2B is a block diagram illustrating an example of the configuration of the display control device 200. The display control device 200 of this embodiment can be configured using such a display device as a smartphone. Here a CPU 201, a memory 202, a non-volatile memory 203, an image processing unit 204, a display 205, an operation unit 206, a storage medium interface 207, an external interface 209 and a communication interface 210 are connected to an internal bus 250. Further, the sound output unit 212 and an attitude detection unit 213 are also connected to the internal bus 250. Each unit connected to the internal bus 250 is configured such that data can be exchanged with one another via the internal bus 250.

The CPU 201 is a control unit that controls the display control device 200 in general. The CPU 201 includes at least one processor or circuit. The memory 202 includes a RAM (e.g. volatile memory constituted of semiconductor elements), for example. The CPU 201 controls each unit of the display control device 200 in accordance with programs stored in the non-volatile memory 203, for example. In this case, the CPU 201 uses the memory 202 as a work memory. The non-volatile memory 203 stores such data as image data and sound data and various programs for the CPU 201 to operate. The non-volatile memory 203 is constituted of a flash memory or ROM, for example.

Based on the control by the CPU 201, the image processing unit 204 performs various types of image processing on images stored in the non-volatile memory 203 or the storage medium 208, the video signals acquired via the external interface 209, an image acquired via the communication interface 210, and the like. The image processing performed by the image processing unit 204 includes A/D conversion processing, D/A conversion processing, encoding processing of image data, compression processing, decoding processing, magnifying/demagnifying processing (resizing), noise reduction processing, and color conversion processing. The image processing unit 204 also performs various types of image processing, including panoramic developing, mapping processing and conversion processing on a VR image, which is a wide-range image (including both an omnidirectional image and a non-omnidirectional image) having wide-range of data. The image processing unit 204 may be configured by dedicated circuit blocks to perform specific image processing. Depending on the type of image processing, the CPU 201 may execute image processing according to a program without using the image processing unit 204.

The display 205 displays a graphical user interface (GUI) screen to configure images and the GUI based on the control by the CPU 201. The CPU 201 controls each unit of the display control device 200 by generating and outputting a display control signal in accordance with the program. Thereby each unit of the display control device 200 is controlled to generate video signals for displaying the image on the display 205, and output the image signals to the display 205. Then the display 205 displays the image based on the outputted video signals. The display control device 200 may include only a configuration up to the interface to output the video signals to display the image on the display 205. In this case, the display 205 may be an external monitor (e.g. TV).

The operation unit 206 is an input device to receive user operation. The operation unit 206 includes a text information input device (e.g. keyboard), a pointing device (e.g. mouse, touch panel), buttons, a dial, a joystick, a touch sensor, a touchpad, and the like. The touch panel is a flat device superimposed on the display 205. The touch panel is an input device configured to output coordinate information in accordance with the touched position.

In the storage medium interface 207, a storage medium 208 (e.g. memory card, CD, DVD) can be installed. Based on the control by the CPU 201, the storage medium interface 207 reads data from the installed storage medium 208, or writes data to the storage medium 208. The external interface 209 is an interface to input/output video signals and audio signals by connecting an external device (e.g. VR camera 100) wirelessly or via cable. The communication interface 210 is an interface to transmit/receive various data, such as files and commands, by communicating with an external device and Internet 211.

The sound output unit 212 outputs sound of a moving image and music data, operation tones, ring tones, various notification tones, and the like. The sound output unit 212 includes the sound output terminal 212a to connect an earphone or the like and the speaker 212b. The sound output unit 212 may output the sound via wireless communication.

The attitude detection unit 213 detects (senses) the attitude of the display control device 200 with respect to the gravity direction, and the inclination of the attitude with respect to each axis of yaw, roll and pitch. Based on the attitude detected by the attitude detection unit 213, it can be determined whether the display control device 200 is held horizontally or vertically, whether the display control device 200 is turned up or down, or is in a diagonal attitude, for example. For the attitude detection unit 213, at least one of an acceleration sensor, gyro sensor, geomagnetic sensor, azimuth sensor, altitude sensor, and the like, or a plurality of these sensors may be combined.

The operation unit 206 includes the touch panel 206a. The CPU 201 can detect the following operations on the touch panel 206a or the state thereof.

A finger or pen which is not touching the touch panel 206a touches the touch panel 206a, that is, touch is started (hereafter Touch-Down).

A finger or pen is touching the touch panel 206a (hereafter Touch-On).

A finger or pen is moving in the state of touching the touch panel 206a (hereafter Touch-Move).

A finger or pen which is touching the touch panel 206a is released from the touch panel 206a, that is, touch is ended (hereafter Touch-Up).

Nothing is touching the touch panel 206a (hereafter Touch-Off).

When Touch-Down is detected, Touch-On is also detected at the same time. Unless Touch-Up is detected after Touch-Down. Touch-On is normally detected continuously. In the case where Touch-Move is detected as well, Touch-On is detected at the same time. Even if Touch-On is detected, Touch-Move is not detected unless the touch position is moving. Touch-Off is detected when Touch-Up of all fingers or pen is detected.

These operations, states and positional coordinates of the fingers or pen touching the touch panel 206a are notified to the CPU 201 via the internal bus. Then based on the notified information, the CPU 201 determines the kind of operation (touch operation) that was performed on the touch panel 206a. For Touch-Move, the CPU 201 can also determine the moving direction of the fingers or pen on the touch panel 206a, based on the change of the positional coordinates, for the vertical components and horizontal components of the touch panel 106a respectively. If Touch-Move is detected for at least a predetermined distance, the CPU 201 determines that the slide operation was performed.

An operation of quickly moving a finger on the touch panel 206a for a certain distance in the touched state and releasing the finger is called "flick". In other words, flick is an operation of moving and releasing the finger rapidly on the touch panel 206a. If Touch-Move is detected for at least a predetermined distance at a predetermined speed or faster, and Touch-Up is detected thereafter, the CPU 201 determines that flick was performed (determines that flick was performed after a slide operation). Further, a touch operation of touching a plurality of points (e.g. two points) simultaneously, and moving these touch positions closer together is called "Pinch-In", and a touch operation of moving these two positions further apart is called "Pinch-Out". Pinch-In and Pinch-Out are collectively called a pinch operation (or simply "pinch").

For the touch panel 206a, various types of touch panels may be used, such as a resistive film type, a capacitive type, a surface acoustic wave type, an infrared type, an electromagnetic induction type, an image recognition type and an optical sensor type. There is a type of detecting touch when the touch panel is actually contacted, and a type of detecting touch when a finger or pen approaches the touch panel, but either type may be used.

Figure 2C:
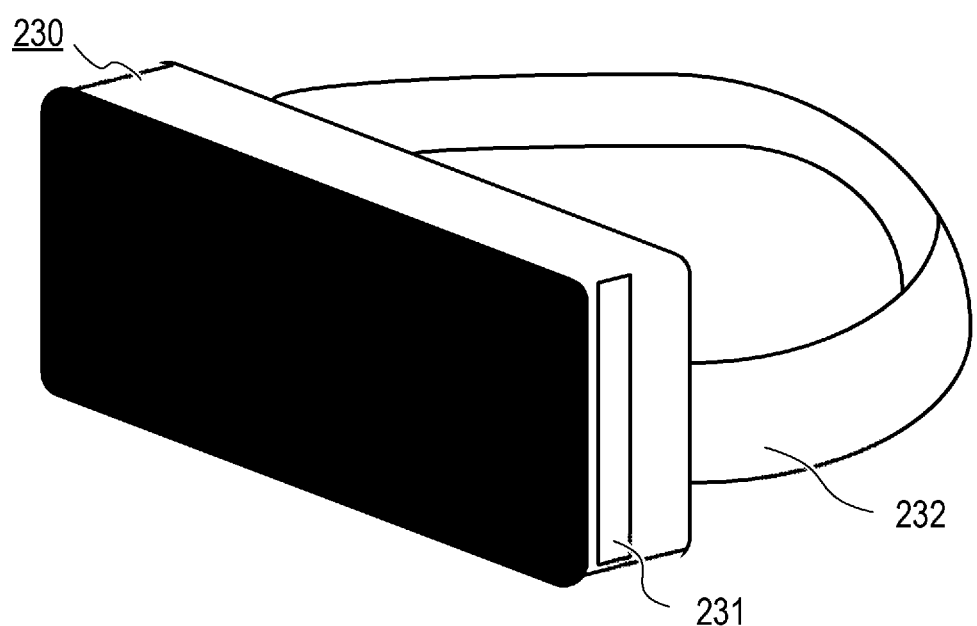

FIG. 2C is an external view of VR goggles (a head mount adaptor) 230 on which the display control device 200 can be installed. The display control device 200 can be used as a head mount display (HMD) by being installed in the VR goggles 230.

An insertion slit 231 is a slit to insert the display control device 200. The entire display control device 200 can be inserted into the VR goggles 230 such that the display surface of the display 205 faces a head band 232, which is used to secure the VR goggles 230 to the head of the user (in other words, the display surface faces the user). Thus the user can view the display 205 of the display control device 200 in the state of wearing the VR goggles 230 on their head without holding the display control device 200 by hand. In this case, the attitude of the display control device 200 changes as the user moves their head or body. The attitude detection unit 213 detects the change in the attitude of the display control device 200, and the CPU 201 performs the VR display processing based on this change in attitude. In this case, the attitude detection unit 213 "detecting the attitude of the display control device 200" is equivalent to "detecting the attitude of the head of the user (direction the eyes of the user are facing)". It should be noted that the display control device 200 itself may be an HMD having mounting unit which can be mounted on the head of the user without the VR goggles.

Zenith Correction

The display control device 200 can perform zenith correction to correct the display direction (display region) and display the zenith-corrected VR image by the CPU 201 controlling the image processing unit 204, so that the user can view the image more easily. It should be noted that the display control device 200 can perform zenith-corrected display, but can also perform display without zenith correction. Now the zenith correction, which is performed when a VR image is displayed, will be described with reference to FIG. 3A to FIG. 3C.

Figure 3A:
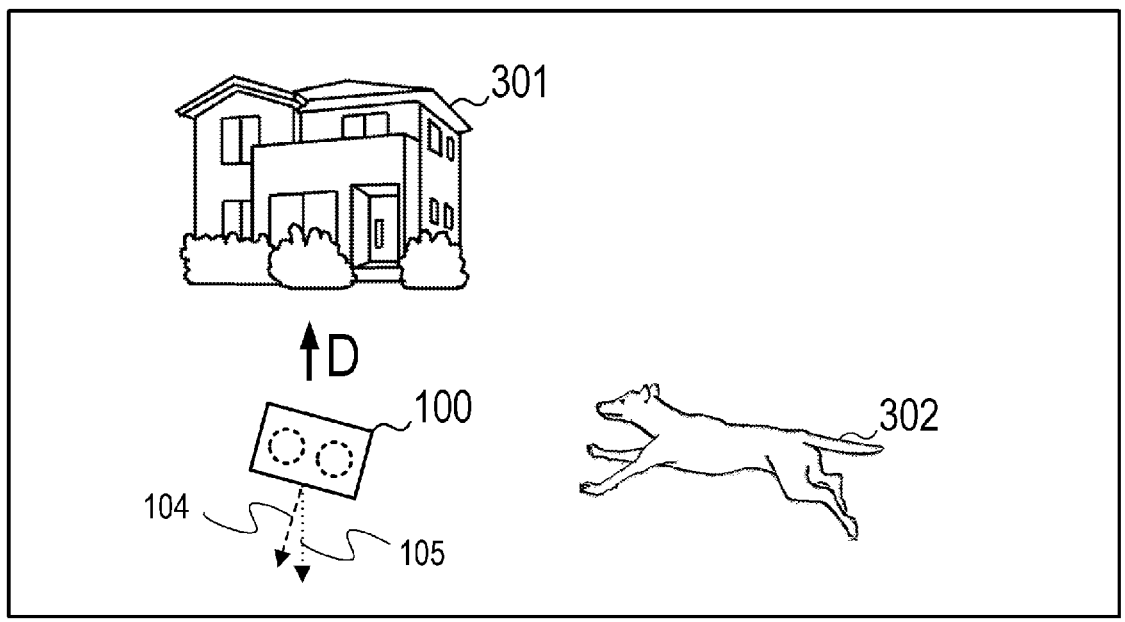
FIG. 3A to FIG. 3C are diagrams for describing zenith correction according to an embodiment.

FIG. 3A is a schematic diagram illustrating a state when the imaging (image capturing) by the VR camera 100 is performed. In FIG. 3A, the VR camera 100 captures a VR image (wide range image) of a house 301 and a dog 302 as the subjects. Here the house 301 is located in direction D (e.g. North) when viewed from the VR camera 100, and the dog 302 is located in a direction (e.g. East) that is 90° to the right from direction D when viewed from the VR camera 100. The VR camera 100 is held slightly inclined to the right with respect to the gravity direction 105, therefore the gravity direction 105 and the vertical direction 104 (vertical axis) of the VR camera 100 are not parallel. It is assumed that in this state the user captures a VR image (moving image or still image) directing the imaging lenses of the VR camera 100 to the house 301, and the VR camera 100 records the imaging result as the image A.

Figure 3B:
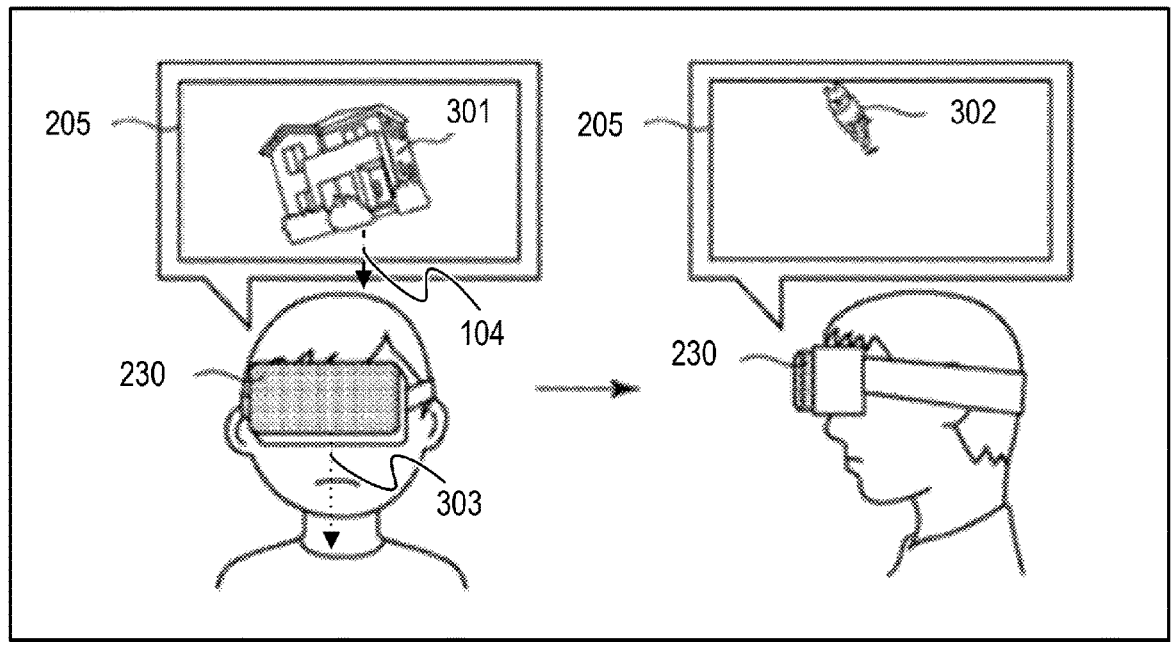

FIG. 3B is a schematic diagram illustrating a case where the display control device 200 reproduces (displays) the image A captured in the state of FIG. 3A without performing the zenith correction. The display control device 200 (CPU 201) acquires the image A by file transfer from the storage medium of the VR camera 100 wirelessly or via cable, or from the storage medium 208, such as s memory card, installed in the display control device 200.

FIG. 3B also indicates display examples of the display 205 in the case where a partial region of the image A is VR-displayed (VR view) in accordance with the attitude of the display control device 200. On the left side of FIG. 3B, the VR goggles 230, in which the display control device 200 is installed, are mounted on the head of the user, and the user is viewing the image A in VR display. The image A is a VR image which was captured by the VR camera 100 in an inclined state. Therefore if the zenith correction is not performed, a subject (image) inclined to the left (opposite direction of inclination of the VR camera 100 to the right with respect to the gravity direction 105 during image capturing) is displayed on the display 205. In other words, in the case of not performing the zenith correction, the house 301 of the image A is displayed in the inclined state. Specifically, in the VR display, the image A is displayed such that the direction in the image A, corresponding to the vertical direction 104 of the VR camera 100 during image capturing, is parallel with the gravity direction 303 (direction of an axis passing through the zenith) detected by the attitude detection unit 213 of the display control device 200. It should be noted that if the display method is not the VR display, the image A is displayed such that the direction in the image A, corresponding to the vertical direction 104 of the VR camera 100 during the image capturing, is parallel with the vertical direction of the display 205 of the display control device 200.

The right side of FIG. 3B indicates a display example of the display 205 in the case where the user turned to the right horizontally from the state on the left side of FIG. 3B. Based on the change in the attitude when the user turned to the right, the display range (direction) of the image A is changed, and the range (direction) where the dog 302 is image-captured is displayed. In this state, the dog 302 is also displayed in the inclined state. If the position to which the user turns is changed to the left or right in the horizontal direction, the display control device 200 changes the display range of the image A by rotary-moving the display range around the vertical direction 104 of the VR camera 100 during the images capturing as the axis. Therefore in the display viewed by the user, the position of the dog 302 in the vertical direction, which should be seen at a height similar to the house 301, deviates.

Figure 3C:
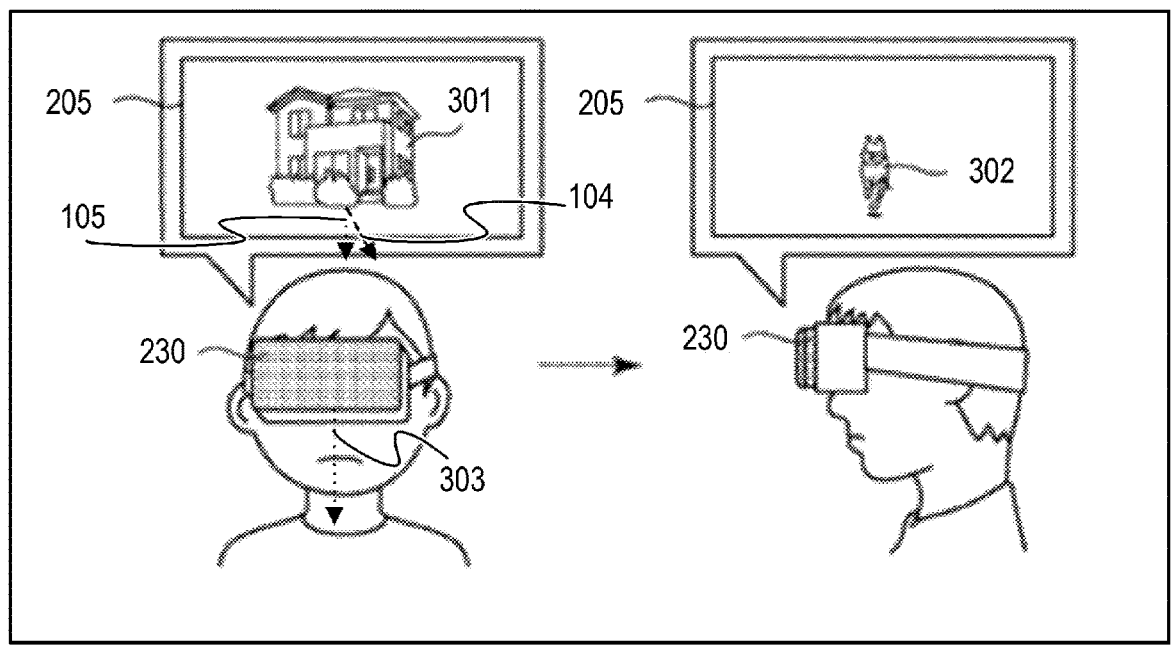

FIG. 3C is a schematic diagram illustrating a case where the display control device 200 displays (reproduces) the image A after performing the zenith correction. The image A is captured in the state of FIG. 3A. Similarly to FIG. 3B, FIG. 3C is a case where the display method is the VR display (VR view). On the left of FIG. 3C, the VR goggles 230, in which the display control device 200 is installed, are mounted on the head of the user, and the user is viewing the image A in the VR display.

In FIG. 3C, the orientation (display) of the image A is corrected (zenith correction) such that the gravity direction 105, when the VR camera 100 detected when the image A is captured, becomes parallel with the vertical direction when the image is reproduced. Specifically, the image A is corrected and displayed such that the direction in the image A, corresponding to the gravity direction 105 (gravity direction detected by the VR camera 100) during image capturing, is parallel with the gravity direction 303 detected by the attitude detection unit 213 of the display control device 200. In other words, if the zenith correction is performed, the house 301 is displayed without being inclined in the image A. It should be noted that if the display method is not the VR display, the image A is displayed such that the direction in the image A, corresponding to the gravity direction 105 during the image capturing, is parallel with the vertical direction of the display 205 of the display control device 200. In either case, the display orientation is corrected so as to cancel the deviation amount between the vertical direction 104 of the VR camera 100 during image capturing, which is inclined with respect to the gravity direction 105 (direction of an axis passing through the zenith), and the gravity direction 105 detected by the VR camera 100 when the image A is captured.

The right side of FIG. 3C indicates a display example of the display 205 in the case where the user turned to the right horizontally from the state on the left side of FIG. 3C. Based on the change in the attitude when the user turned to the right, the display range (direction) of the image A is changed, and the region where the dog 302 is image-captured is displayed. In this state, the dog 302 is also displayed without inclination. Further, in the VR display, the dog 302 is seen at a similar height as the house 301, similarly to the actual view.

Display Mode

The display control device 200 determines whether or not the zenith correction is performed on a VR image to be displayed, depending on the display mode (display manner). In this embodiment, there are four display modes; a thumbnail display mode illustrated in FIG. 4A; a plane image display mode illustrated in FIG. 4B; a single-lens VR display mode illustrated in FIG. 4C; and a twin-lens VR display mode illustrated in FIG. 4E and FIG. 4F. In the following, a display using a set (image set) of two VR images (images for left and right eyes) having parallax in the gravity direction and in the horizontal direction, captured by the VR camera 100, will be described with reference to FIG. 4A to FIG. 4F. In the thumbnail display mode, the plane image display mode and the single-lens VR mode, it is assumed that the user views the display of the entire screen with both the left and right eyes. In the twin-lens VR display mode, on the other hand, it is assumed that the image on the right side of the two images, which are lined up on the left side and right side of the region of the screen, is seen with the right eye, and the image on the left side thereof is seen with the left eye.

Figure 4A:
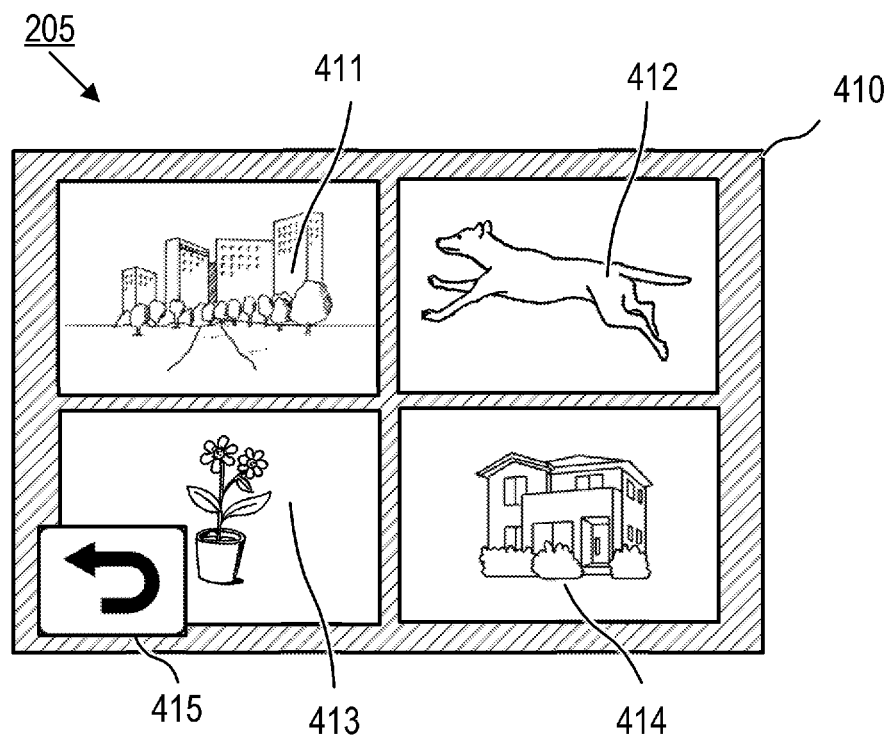
FIG. 4A to FIG. 4F are diagrams for describing display modes according to an embodiment.

The thumbnail display mode illustrated in FIG. 4A is a display mode in which a plurality of images are arranged on one screen. The thumbnail display mode is a mode for the user to select a VR image (image set) to be displayed for viewing. Each one of the plurality of images displayed in the thumbnail display mode is one of the VR images included in one image set recorded in the storage medium 208. Screen 410 is a screen of the display 205 in the thumbnail display mode. Images 411 to 414 indicate a part or whole of a region of the recorded VR images. The user can select a VR image (image set) to be viewed by performing a touch operation to any one of the images 411 to 414. VR images (image sets) to be displayed in the thumbnail display mode can be changed by performing the flick operation. A button 415 is a software button for the user to operate. By selecting the button 415, the user can end the display of the VR image. In this mode, the images 411 to 414, after performing the zenith operation, are displayed. Since both the left and right eyes of the user see the same display, double images are not generated in stereoscopic vision, and the zenith correction makes it easier for the user to view the images.

Figure 4B:
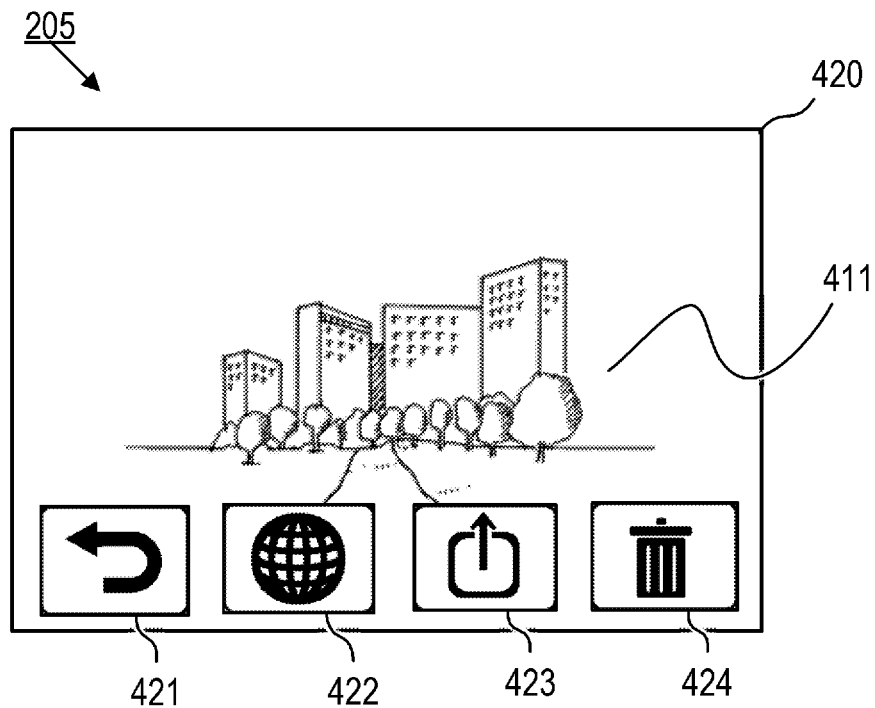

The plane image display mode illustrated in FIG. 4B is a mode in which the entire image of one of the VR images included in the image set (image set of one VR image the user selected in thumbnail mode) is displayed on one screen. A screen 420 is a screen of the display 205 where the VR image, which the user selected in the thumbnail display mode, is displayed on one screen (plane image). Buttons 421 to 424 are software buttons for the user to perform each operation. By the user selecting one of the buttons 421 to 424, a function assigned to the selected button can be executed. Specifically, if the user touches the button 421, the display returns to the previous display. If the user touches the button 422, the VR image currently displayed is displayed as a single-lens VR display image (display mode is shifted to the single-lens VR display mode). Other functions are assigned to the buttons 423 and 424. For example, a function to share the VR image with an external device (another user) is assigned to the button 423. And, for example, a function to delete the VR image from the storage medium 208 is assigned to the button 424. In this mode, the image 411 after performing the zenith correction is displayed. Since both the left and right eyes of the user see the same display in this mode, double images are not generated in stereoscopic vision, and the zenith correction makes it easier for the user to view the image.

Figure 4C:
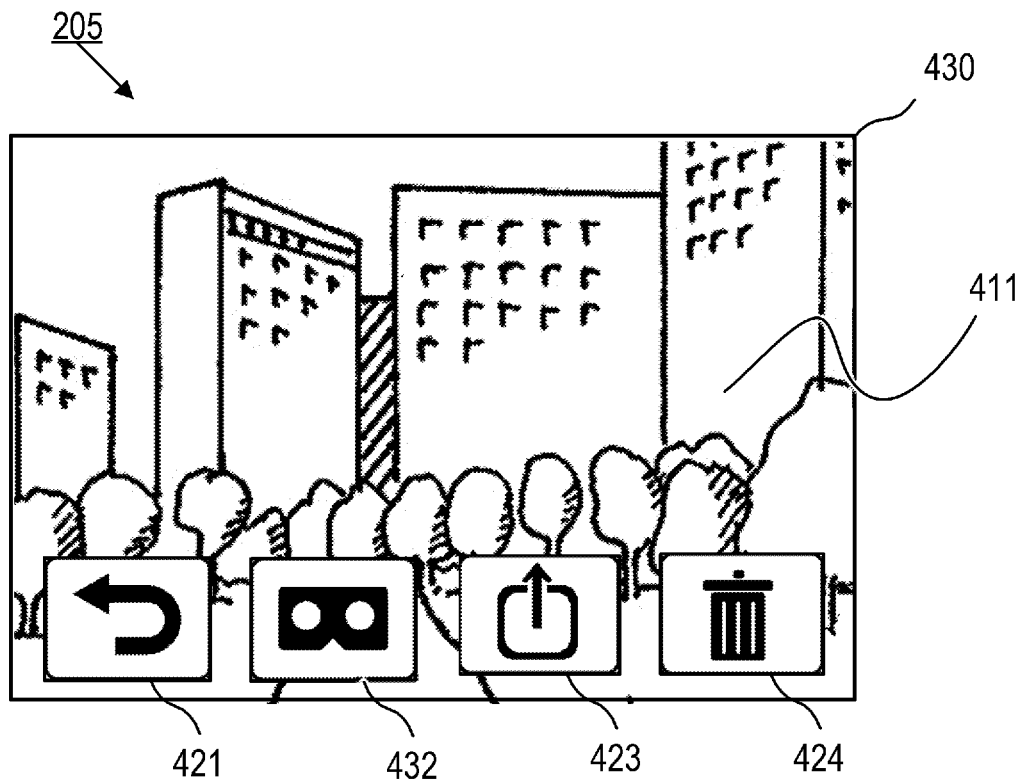

The single-lens VR display mode illustrated in FIG. 4C is a mode in which the VR image (one of the VR images included in the image set of the VR image previously displayed in plane image display) is mapped on a virtual sphere, and a partial region of this transformed image is displayed. In the single-lens VR display mode, the display range can be changed in accordance with the display range change operation by the user. Screen 430 is a screen of the display 205 in the single-lens VR display. Button 432 is a software button for the user to operate. By the user touching the button 432, the currently displayed VR image is displayed as a twin-lens VR display image (display mode is shifted to the twin-lens VR display mode). In this mode, a partial region of the image 411 after performing the zenith correction is displayed. Since both the left and right eyes of the user see the same display in this mode, double images are not generated in stereoscopic vision, and the zenith correction makes it easier for the user to view the image.

Figure 4D:
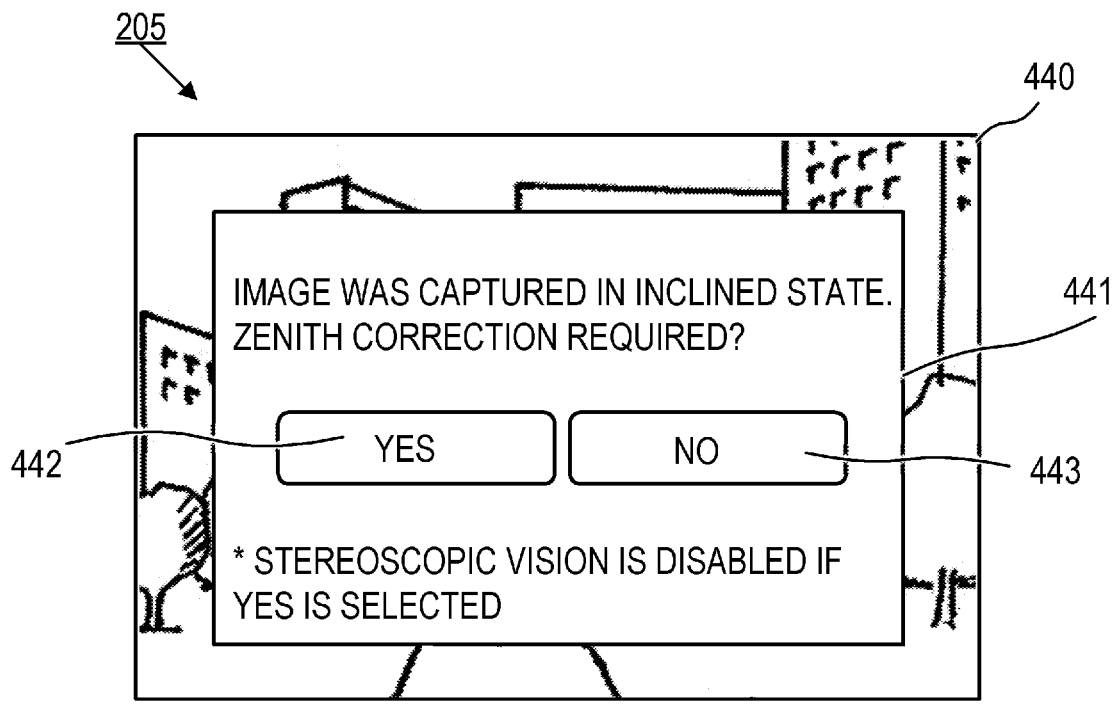
Figure 4E:
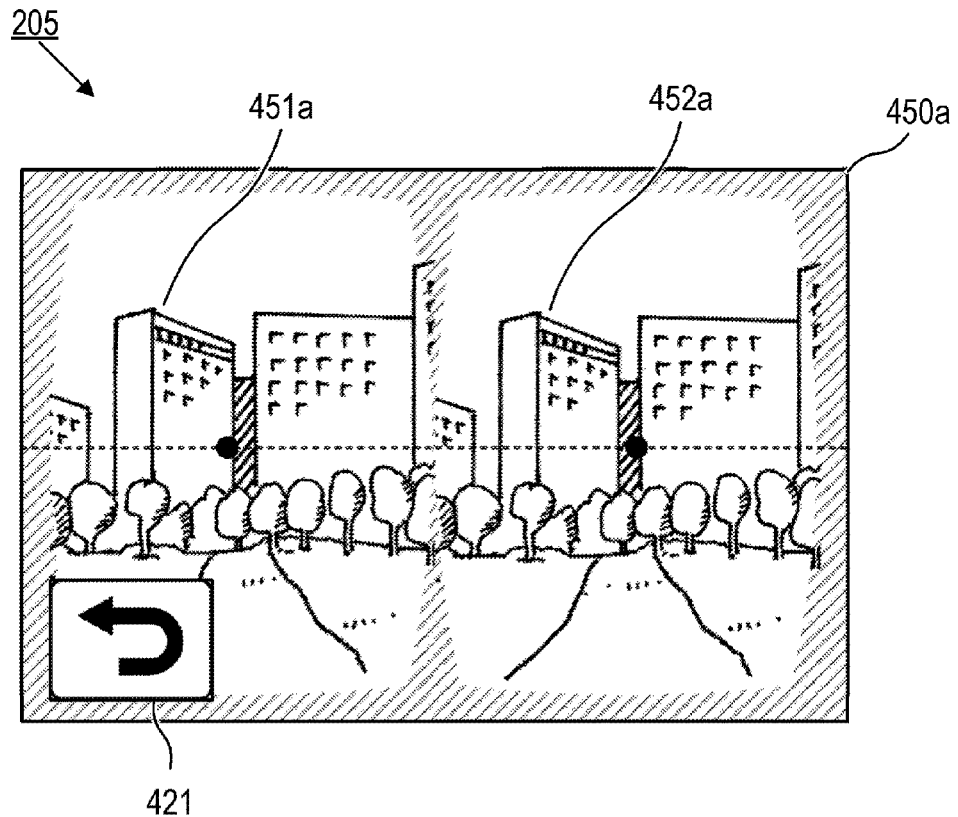

FIG. 4D is a screen that is displayed when the user instructed the twin-lens VR display, and indicates a guide display screen 440 for the zenith correction. A guide display 441 is a display to inquire (confirm) for the user whether execution of the zenith correction in the twin-lens VR display is enabled or disabled. Buttons 442 and 443 are software buttons for the user to perform operations. If the user touches the button 442, the zenith correction in the twin-lens VR display is enabled, and the screen in FIG. 4E is displayed on the display 205. If the user touches the button 443, on the other hand, the zenith correction in the twin-lens VR display is disabled, the screen in FIG. 4F is displayed on the display 205.

Figure 4F:
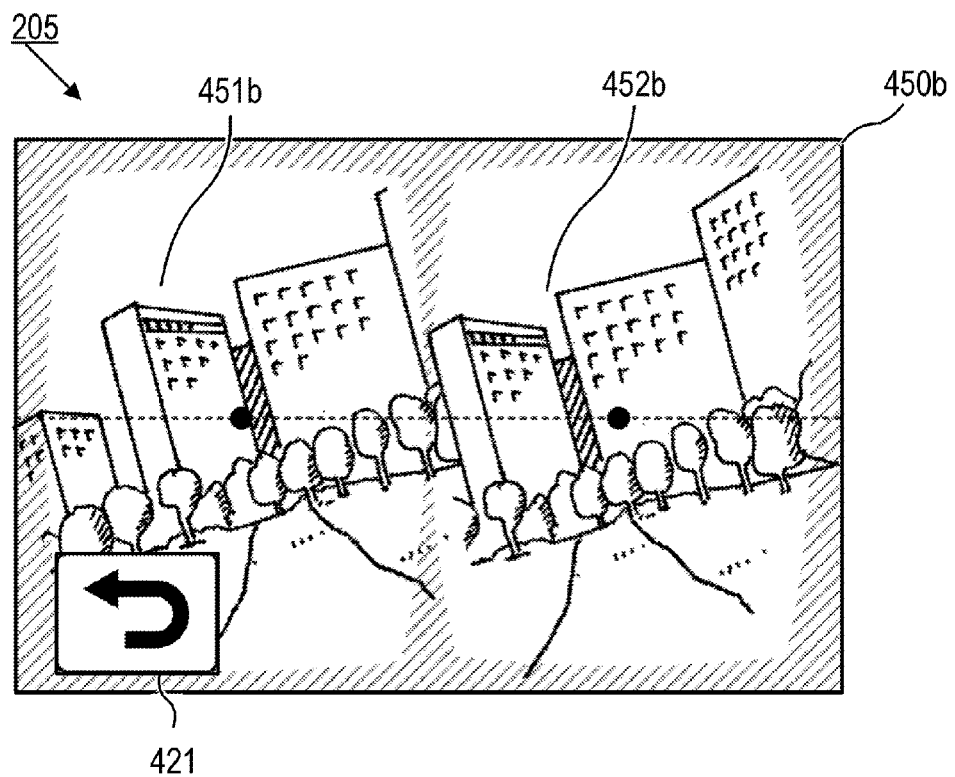

The twin-lens VR display mode illustrated in FIG. 4E and FIG. 4F is a mode in which the images of an image set (image set of the VR image previously displayed in the single-lens VR display) are mapped on a virtual sphere respectively, and a partial region of each transformed image is displayed side-by-side. In the twin-lens VR display mode, the display range can be changed in accordance with the display range change operation by the user. Screens 450*a* and 450*b* are screens of the display 205 in the twin-lens VR display respectively.

Images 451*a* and 452*a* on the screen 450*a* illustrated in FIG. 4E are identical VR images which are captured by the left optical system of the VR camera 100 and performed the zenith correction. In other words, in the twin-lens VR display mode illustrated in FIG. 4E, one of the VR images included in the image set is displayed side-by-side. The image 451a is a VR image for the left eye of the user to see, and the image 452a is a VR image for the right eye of the user to see. For the images 451a and 452a, a VR image, captured by the right optical system of the VR camera 100, may be used. Here the images 451a and 452a are identical images, hence parallax is not generated. In the case of the twin-lens VR display illustrated in FIG. 4E, two images without parallax are displayed, hence the user cannot have a stereoscopic vision. However the double images caused by parallax between two VR images is not generated, since both the left and right eyes of the user see identical images. Therefore the zenith correction makes it easier for the user to view the image.

An image 451b on the screen 450b illustrated in FIG. 4F is a VR image captured by the left optical system of the VR camera 100, and an image 452b thereon is a VR image captured by the right optical system of the VR camera 100. In the twin-lens VR display mode illustrated in FIG. 4E, both of the VR images of an image set are displayed side-by-side. In other words, one of the images (image 451b) on the screen 450b is a VR image for the left eye of the user to view, and the other image (image 452b) is a VR image for the right eye of the user to view. These two images have parallax, but have not received zenith correction. Since the Zenith correction has not been performed, parallax in the gravity direction is not generated between the two images when viewing, and problems related to stereoscopic vision, such as double images, are unlikely to occur. Further, stereoscopic vision is possible since the two images have parallax from each other.

As described above, the display control device 20 performs the zenith correction on a VR image to be displayed, except for the case of the twin-lens VR display mode out of the four display modes. In the case of the twin-lens VR display mode, the display control device 200 allows the user to select whether or not the zenith correction is performed on a VR image to be displayed. Specifically, in this embodiment, the display control device 200 performs the zenith correction on a VR image in the case where the left and right eyes of the user see identical display images. In the case where the left and right eyes of the user see mutually different display images, on the other hand, the display control device 200 does not performed the zenith correction on the VR images.

Display Control Processing

Figure 5:
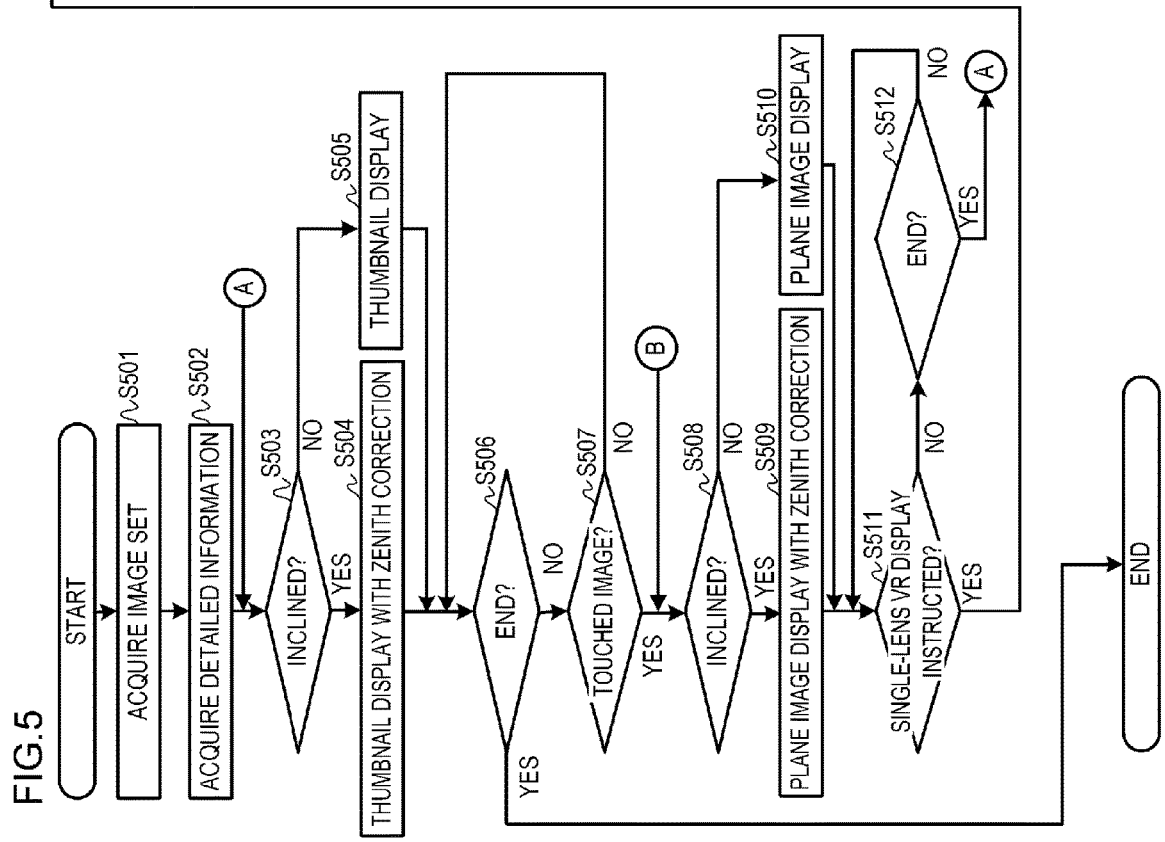
FIG. 5 is a flow chart depicting a processing of a display control according to an embodiment.
Figure 5:
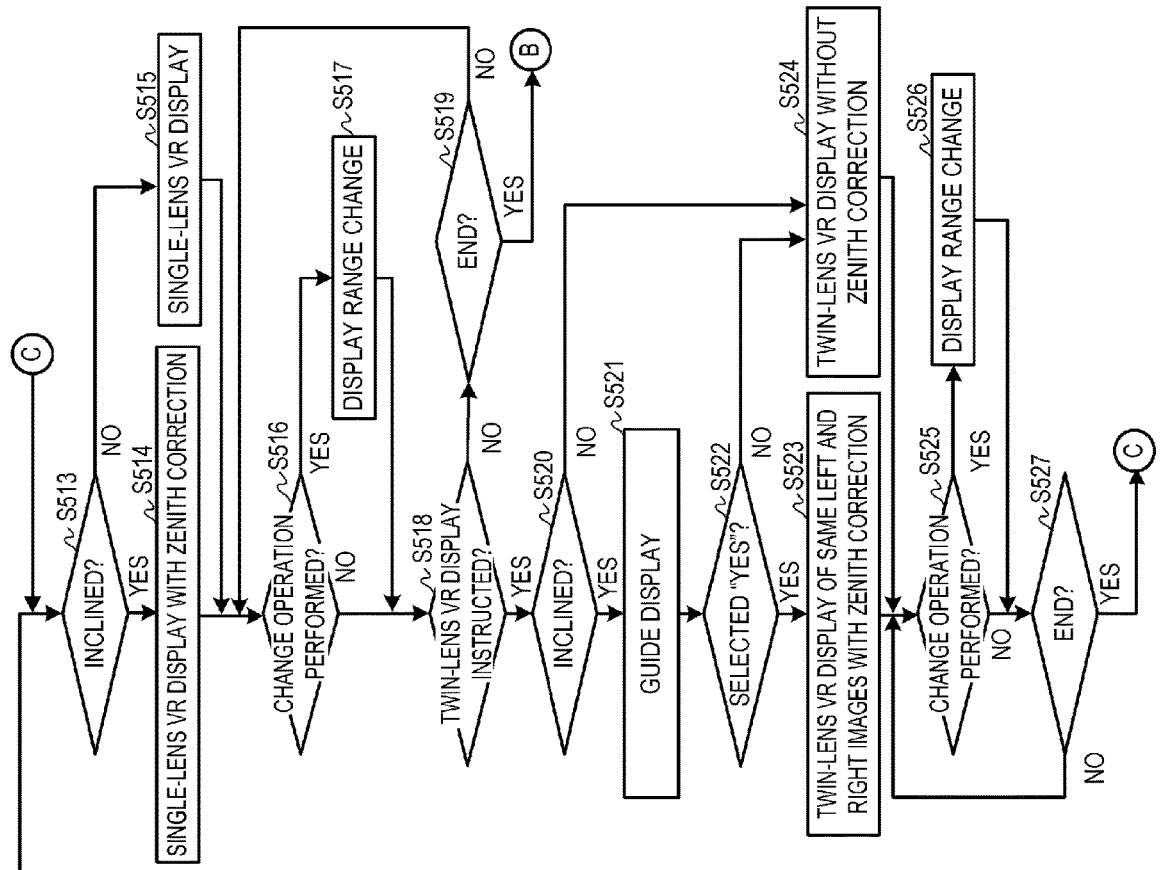

A display control processing by the display control device 200 will be described with reference to a flow chart in FIG. 5. When display of a VR image is instructed to the operation unit 206 of the display control device 200 by a predetermined user operation, the processing in the flow chart in FIG. 5 starts. Each processing step in the flow chart in FIG. 5 is implemented by the CPU 201 developing a program, which is stored in the non-volatile memory 203, in the memory 202, and executing the program. In this embodiment, it is assumed that the display control device 200 performs display control for an image set (image file) captured (acquired) by the VR camera 100.

In S501, the CPU 201 reads (acquires) a plurality of image sets (image files), captured by the VR camera 100, from the storage medium 208. In this embodiment, the CPU 201 reads (acquires) four image sets from the storage medium 208, in order to display the thumbnails illustrated in FIG. 4A.

In S502, from the storage medium 208, the CPU 201 reads (acquires) detailed information on each of the plurality of image sets which were read in S501. The detailed information in this case is, for example, the inclination information on the image set, the gravity direction of the VR camera 100 during image capturing, and the vertical direction of the VR camera 100 during image capturing. For example, the inclination of the vertical direction 104 of the VR camera 100 during image capturing, with respect to the gravity direction 105 (inclination information on the VR camera 100 during image capturing), is attached to the image set as the inclination information on the image set by the VR camera 100, and is stored in the storage medium 208. The VR camera 100 may acquire the inclination of the vertical direction 104 of the VR camera 100, with respect to the gravity direction 105 during image capturing, by using a gyro sensor of the VR camera 100 or the like. The inclination information on the image set can be regarded as the inclination information of the direction connecting the two optical systems (lenses 101 and 102) of the VR camera 100, with respect to the horizontal direction during capturing the image set.

In S503, for each of the plurality of image sets that were read, the CPU 201 determines whether each image set is an inclined image set based on the inclination information. Here "inclined image set" refers to an image set (VR image) captured in a state where the gravity direction 105 and the vertical direction 104 of the VR camera 100 are not parallel, or an image set (VR image) captured in a state where the horizontal direction and the direction connecting the two optical systems (lenses 101 and 102) of the VR camera 100 are not parallel. Therefore the CPU 201 may determine whether the image set is inclined or not by determining whether the gravity direction 105 of the VR camera 100 during image capturing and the vertical direction 104 of the VR camera 100 during image capturing are parallel. Processing advances to S504 if the image set, out of the plurality of image sets, is an inclined image set, or to S505 if not.

The CPU 201 may determine the inclination information of an image set based on the characteristics of the VR image (image set). For example, the CPU 201 extracts a characteristic of the lines in the VR image using a known line extraction method, and calculates the coordinates of two points where many lines cross. Then the CPU 201 acquires the inclination of the VR camera based on the position and the inclination of the line segment connecting these two points.

In S504, the CPU 201 controls the image processing unit 204 to perform the zenith correction on one VR image included in the inclined image set determined in S503, and performs the thumbnail display on the display 205. In the thumbnail display in S504, a distorted image is generated by the equidistant cylindrical projection, such as an image 411 in FIG. 4A. In the image 411, the entire VR image is displayed (framed), hence the display range cannot be changed. The image 411 may be an image in a predetermined square range extracted from the center of a rectangular VR image drawn by the equidistant cylindrical projection, instead of the entire VR image framed in the screen.

In S505, the CPU 201 displays one VR image, included in the uninclined image set determined in S503, on the display 205 as a thumbnail display. Here the CPU 201 does not perform the zenith correction on the VR image. For example, in the thumbnail display in S505, the images 412 to 414 in FIG. 4A, for example, are displayed.

In other words, the processing steps in S503 to S505 are independently executed for each of the plurality of image sets. Specifically, in S503, for each of the plurality of image sets which were read in S501, the CPU 201 determines whether the image set is an inclined image set. Then among the plurality of image sets, an inclined image set is zenith-corrected and displayed as one image in the thumbnail display in S54. An uninclined image set is not zenith-corrected, and is displayed as one image in the thumbnail display.

In S506, the CPU 201 determines whether the user instructed to end the thumbnail display mode. Here the CPU 201 determines that the user instructed to end the thumbnail display mode when the user pressed the button 415 in FIG. 4A. All the processing steps in the flow chart in FIG. 5 end if the user instructed to end the thumbnail display mode, or processing advances to S507 if not.

In S507, the CPU 201 determines whether the user performed a touch operation, to select any one of the VR images among the plurality of VR images (images 411 to 414 in the case of FIG. 4A) displayed in the thumbnail display. The touch operation is either Touch-Down or Touch-Up. Processing advances to S508 if the touch operation is performed, or to S506 if not. In the following description, a VR image that the user selected in S507 is referred to as a "selected image", and an image set including the selected image is referred to as a "selected image set".

In S508, the CPU 201 determines whether the selected image set is an inclined image set, based on the inclination information on the selected image set. Processing advances to S509 if the selected image set is an inclined image set, or to S510 if not.

In S509, the CPU 201 controls the image processing unit 204 to perform the zenith correction on the selected image, and performs the plane image display on the display 205, as illustrated in FIG. 4B. In FIG. 4B, a distorted VR image, generated by the equidistant cylindrical projection, is displayed (a transformation by being mapped on a virtual sphere is not performed). Here the display range cannot be changed since the entire VR image is framed in the screen and displayed in this state.

In S510, the CPU 201 displays (performs the plane image display) the selected image on the display 205 without performing the zenith correction.

In S511, the CPU 201 determines whether the user instructed single-lens VR display. The CPU 201 determines that the user instructed the single-lens VR display when the button 422 in FIG. 4B is touched by the user, for example. Processing advances to S513 if the single-lens VR display is instructed, or to S512 if not.

In S512, the CPU 201 determines whether the user performed an operation to end the plane image display. For example, the CPU 201 determines that the operation to end the plane image display is performed when the user touches the button 421 in FIG. 4B. Processing advances to S503 if the user performs the operation to end the plane image display, or to S511 if not.

In S513, the CPU 201 determines whether the selected image set is an inclined image set. Processing advances to S514 if the selected image set is an inclined image set, or to S515 if not.

In S514, the CPU 201 controls the image processing unit 204 to perform the zenith correction on the selected image. Then the CPU 201 displays the zenith-corrected selected image on the display 205 as the single-lens VR display, as illustrated in FIG. 4C. In FIG. 4C, a part of the VR image mapped on a virtual sphere is displayed. In other words, in FIG. 4C, a part of the VR image, after performing the image transforming processing, is displayed, so that distortion of the image is removed.

In S515, the CPU 201 does not perform the zenith correction on the selected image and performs the single-lens VR display on the display 205.

In S516, the CPU 201 determines whether the user performed the display range change operation. The display range change operation is a flick operation on the touch panel 206a, or an operation to change the attitude of the display control device 200. Processing advances to S517 if the display range change operation is performed, or to S518 if not.

In S517, the CPU 201 controls the image processing unit 204 to change the range of the selected image to be displayed on the display 205.

In S518, the CPU 201 determines whether the user instructed the twin-lens VR display. For example, the CPU 201 determines that the twin-lens VR display is instructed when the user touches the button 432 in FIG. 4C. Processing advances to S520 if the twin-lens VR display is instructed, or to S519 if not.

In S519, the CPU 201 determines whether the user performed an operation to end the single-lens VR display. For example, the CPU 201 determines that the operation to end the single-lens VR display is performed when the user touches the button 421 in FIG. 4C. Processing advances to S508 if the user performs the operation to end the single-lens VR display, or to S516 if not.

In S520, the CPU 201 determines whether the selected image set is an inclined image set. Processing advances to S521 if the selected image set is an inclined image set, or to S524 if not.

In S521, the CPU 201 displays (performs) a guide display 441 on the display 205, to allow the user to select whether the zenith correction is performed on the selected image, as illustrated in FIG. 4D.

In S522, the CPU 201 determines what the user selected in the guide display 441. Processing advances to S523 if the user selected to perform the zenith correction using the operation unit 206, or to S524 if the user selected not to perform the zenith correction.

The processing steps S521 and S522 are not essential, and if the selected image set is an inclined image set in S520 (Yes in S520), for example, processing may advance to S523.

In S523, the CPU 201 controls the image processing unit 204 to perform the zenith correction on the selected image, and performs the twin-lens VR display on the display 205 (FIG. 4E). In the twin-lens VR display in S523, the VR images for the left and right eyes are the same images without parallax. In S523, stereoscopic vision cannot be implemented, since a same image is displayed for the left and right eyes, but an advantage is that double images or the like, which diminishes visibility, is not generated.

In S524, the CPU 201 performs the twin-lens VR display on the display 205 without performing the zenith correction on both images of the selected image set, (FIG. 4F). In the twin-lens VR display in S524, different VR images, which generate parallax between the left and right eyes, are displayed on the left and right. If the VR images are displayed like this, not only can stereoscopic vision be implemented because the images have parallax, but also visibility is not diminished because the zenith correction is not performed.

In S525, the CPU 201 determines whether the user performed the display range change operation. The display range change operation is a flick operation on the touch panel 206a, or an operation to change the attitude of the display control device 200. Processing advances to S526 if the display range change operation is performed, or to S527 if not.

In S526, the CPU 201 controls the image processing unit 204 to change the range of the VR image to be displayed on the display 205.

In S527, the CPU 201 determines whether the user performed an operation to end the twin-lens VR display. For example, the CPU 201 determines that the operation to end the twin-lens VR display is performed when the user touches the button 421 in FIG. 4E or FIG. 4F. Processing advances to S513 if the user performs an operation to end the twin-lens VR display, or to S525 if not.

According to the above control flow, the user selects whether the zenith correction is performed on the VR image to be displayed, only in the case where the user instructs the twin-lens VR display mode. Therefore according to this embodiment, the VR image, which was captured in the inclined state, can be displayed for each reproduction mode so that the user can view the image most easily. In the case of the plane image display mode, the thumbnail display mode and the single-lens VR display mode, the VR images after performing the zenith correction are displayed, so that the user can easily view and operate on the images. In the case of the twin-lens VR display mode in which images having parallax are displayed side-by-side, such as double images, which are generated by the zenith correction, can be prevented. As a result, a display control device (electronic device), which controls display so that the user can view the VR images captured in the inclined state most easily for each reproduction scene, can be implemented.

In this embodiment, the zenith correction is not performed on the VR image only in the case of the twin-lens VR display mode. Thereby in the twin-lens VR mode when the user is wearing the VR goggles 230 (HMD), the left and right eyes of the user can view the corresponding images of the left and right VR images on the screen. In other words, in the case where the user is wearing the VR goggles 230, performing the zenith correction on the VR images may generate double images. Therefore in the case where the display control device 200 or a mounting detection unit of the VR goggles 230 detects that the VR goggles 230 are worn by the user, the CPU 201 may not perform the zenith correction on the VR images. Further, the CPU 201 may perform the zenith correction on the VR images in the other cases. Here the mounting detection unit may detect that the VR goggles 230 are worn if the distance from the display 205 (display control device 200) to the eyes of the user is within a predetermined distance, for example. Further, the mounting detection unit may detect that the VR goggles 230 are worn if the contact of the VR goggles 230 and the head of the user is detected, for example. The CPU 201 may switch the display mode to the twin-lens VR display mode (mode in which left and right images having parallax are displayed) if the mounting detection unit detects that the VR goggles 230 are worn. The CPU 201 may switch the display mode to another mode, other than the twin-lens VR display mode, if the mounting detection unit does not detect that the VR goggles 230 are worn.

According to the present invention, the VR images captured by a plurality of optical systems can be displayed more suitably.

Various controls described above assuming that these controls are performed by the CPU 201 may be performed by one hardware component, or by a plurality of hardware components (e.g. a plurality of processors and circuits) which share processing to control the entire device.

While the present invention has been described with reference to the preferred embodiments, the present invention is not limited to these specific embodiments, and includes various modes within the scope that does not depart from the essence of the invention. Each of the above mentioned embodiments is merely an example of the invention, and may be combined as required.

In the above embodiments, a case of applying the present invention to the display control device was described as an example, but the present invention is not limited to this, but is applicable to any electronic device that controls a display device which can display VR images for the left and right eyes of a user respectively. In other words, the present invention is applicable to a personal computer, PDA, portable telephone terminal, portable image viewer, head mount display, printer that includes a display, digital photo frame, music player, game machine and electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-220357, filed on Dec. 5, 2019, which is hereby incorporated by reference herein in its entirety.

What is claimed is:

1. An electronic device comprising at least one memory and at least one processor which function as:
   an acquisition unit configured to acquire an image set including a first image and a second image which have parallax from each other; and
   a control unit configured to perform control
   to display the first image without the second image on a display in a first display mode or
   to display both the first image and the second image on the display in a second display mode;

configured to determine, for displaying the image set on the display, whether a user instruction indicates the first display mode or the second display mode; and a correction unit configured to perform a zenith correction on the first image if the image set is displayed on the display in the first display mode and not to perform the zenith correction on both the first image and the second image if the image set is displayed on the display in the second display mode, wherein the control unit performs control to display the first image on which the zenith correction is performed, said display being in the first display mode.

2. The electronic device according to claim 1, wherein the correction unit performs the zenith correction based on inclination information indicating a direction of an optical system for capturing the image set with respect to a horizontal direction.

3. The electronic device according to claim 2, wherein
the image set is captured by an imaging device having two optical systems, and
the inclination information indicates an inclination of a direction, in which the two optical systems are connected with respect to the horizontal direction.

4. The electronic device according to claim 1, wherein the zenith correction is performed such that an orientation of the first image is corrected to cause a direction in the first image corresponding to a gravity direction during image capturing to be parallel with a vertical direction of the display.

5. The electronic device according to claim 1, wherein the zenith correction is performed such that an orientation of the first image is corrected to cause a direction in the first image corresponding to a gravity direction during image capturing to be parallel with a gravity direction during displaying the first image on the display.

6. The electronic device according to claim 1, wherein
the first image and the second image are displayed side-by-side on the display in the second display mode, and
in the second display mode, the first image is an image to be viewed by one of left and right eyes of a user, and the second image is an image to be viewed by another one of the left and right eyes of the user.

7. The electronic device according to claim 1, wherein the image to be displayed is generated by the equidistant cylindrical projection which is mapped on a virtual sphere.

8. A method of controlling an electronic device, the method comprising:
an acquisition step of acquiring an image set including a first image and a second image which have parallax from each other;
performing a first control step to display the first image without the second image on a display in a first display mode or
performing a second control step to display both the first image and the second image on the display in a second display mode;
determining, for displaying the image set on the display, whether a user instruction indicates the first display mode or the second display mode; and
performing a zenith correction on the first image if the image set is displayed on the display in the first display mode and not performing the zenith correction on both the first image and the second image if the image set is displayed on the display in the second display mode,
performing control to display the first image on which the zenith correction is performed, said display being in the first display mode.

9. A non-transitory computer-readable storage medium storing a program to cause a computer to function as each unit of the electronic device according to claim 1.

* * * * *